(12) United States Patent
Yamade et al.

(10) Patent No.: US 7,239,405 B2
(45) Date of Patent: Jul. 3, 2007

(54) IMAGE PROCESSING SYSTEM FOR OUTPUTTING SCANNED IMAGES IN THE SPECIFIED SEQUENCES

(75) Inventors: Yasushi Yamade, Yokohama (JP); Takenori Idehara, Machida (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/258,067

(22) Filed: Feb. 26, 1999

(65) Prior Publication Data

US 2003/0107777 A1    Jun. 12, 2003

(30) Foreign Application Priority Data

Mar. 2, 1998  (JP)  ................................. 10-049638
Mar. 12, 1998 (JP)  ................................. 10-061025

(51) Int. Cl.
*G06F 15/00* (2006.01)
(52) U.S. Cl. ..................................... 358/1.15; 358/1.18
(58) Field of Classification Search ................. 358/1.1, 358/1.2, 1.4, 1.6, 1.13, 1.15, 1.16, 1.17, 442, 358/434, 444, 468, 404
See application file for complete search history.

(56) References Cited

U.S. PATENT DOCUMENTS

| 5,018,078 | A | | 5/1991 | Urabe et al. | |
| 5,666,215 | A | * | 9/1997 | Fredlund et al. | ............. 358/487 |
| 5,734,915 | A | * | 3/1998 | Roewer | ....................... 715/512 |
| 5,751,287 | A | * | 5/1998 | Hahn et al. | ................... 345/351 |
| 6,011,537 | A | * | 1/2000 | Slotznick | ..................... 345/115 |
| 6,026,416 | A | * | 2/2000 | Kanerva et al. | ............. 707/515 |
| 6,028,603 | A | * | 2/2000 | Wang et al. | ................. 345/350 |
| 6,097,389 | A | * | 8/2000 | Morris et al. | ................ 715/804 |
| 6,154,755 | A | * | 11/2000 | Dellert et al. | ................ 707/526 |
| 6,272,484 | B1 | * | 8/2001 | Martin et al. | ................... 707/1 |
| 6,301,586 | B1 | * | 10/2001 | Yang et al. | ................. 707/104 |
| 6,324,545 | B1 | * | 11/2001 | Morag | ......................... 707/202 |
| 6,335,746 | B1 | * | 1/2002 | Enokida et al. | ............. 345/839 |

FOREIGN PATENT DOCUMENTS

| JP | 1-186061 | 7/1989 |
| JP | 5-292268 | 5/1993 |
| JP | 06-103359 | 4/1994 |
| JP | 7-271545 | 10/1995 |
| JP | 09114844 | 2/1997 |
| JP | 9-200457 | 7/1997 |

* cited by examiner

*Primary Examiner*—Kimberly A. Williams
(74) *Attorney, Agent, or Firm*—McDermott Will & Emery LLP

(57) ABSTRACT

An image processing system comprises a photocopier and an information processor. The photocopier scans and images each page of a document, creates a thumbnail image from each scanned image, and sends the thumbnail images to the information processor. Using the information processor, a user then specifies an image output sequence by rearranging the thumbnail images with a pointing device. The photocopier receives this output sequence information from the information processor, and using the printer section of the photocopier prints the scanned images according to the specified output sequence contained in the received sequence information.

22 Claims, 15 Drawing Sheets

PRINTING SEQUENCE SETTING SCREEN (INITIAL SCREEN)

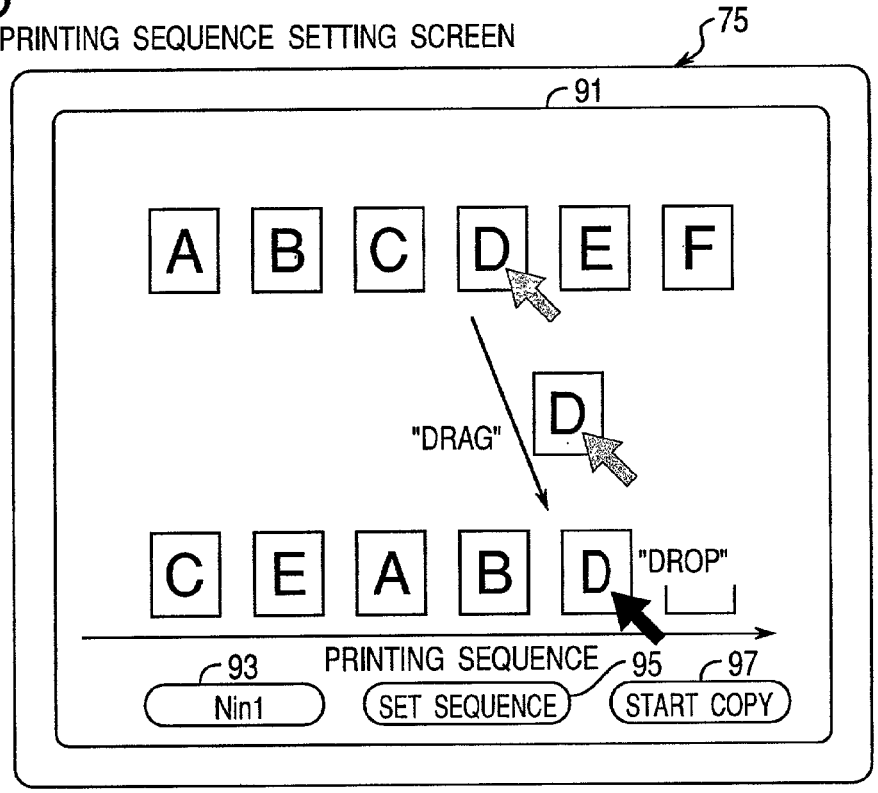
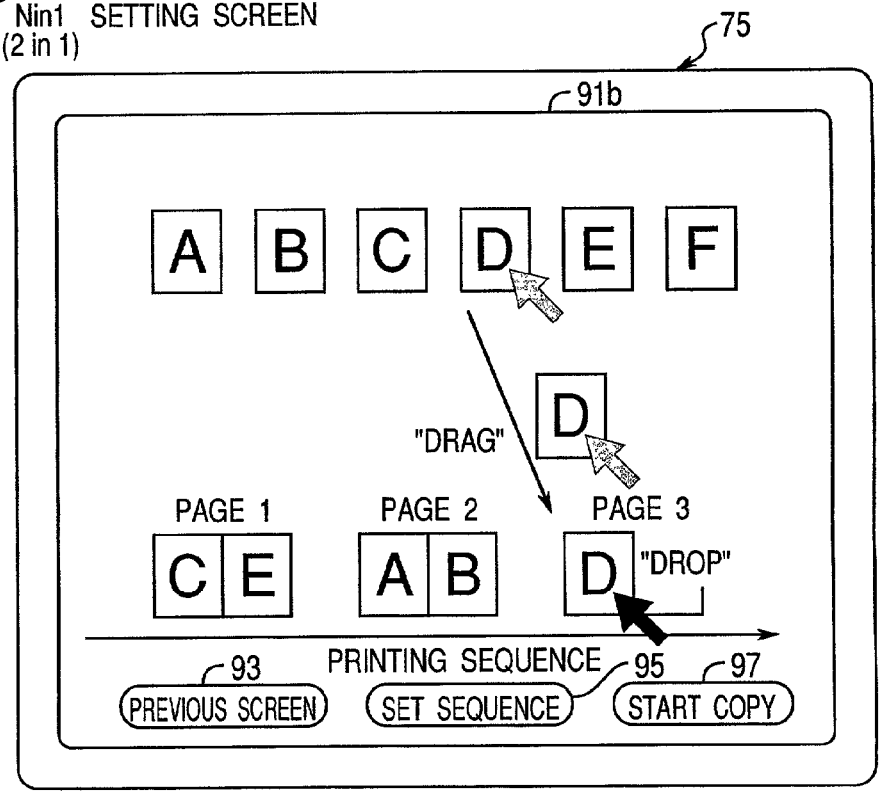

Fig.7

SCANNED SEQUENCE TABLE

| SCANNED SEQUENCE | IMAGE DATA | THUMBNAIL IMAGE |
|---|---|---|
| 1 | a | A |
| 2 | b | B |
| 3 | c | C |
| 4 | d | D |
| 5 | e | E |
| 6 | f | F |

Fig.8A  Fig.8B

PRINTING SEQUENCE SPECIFICATION TABLE

| REARRANGED SEQUENCE | THUMBNAIL IMAGE |
|---|---|
| 1 | C |
| 2 | D |
| 3 | A |
| 4 | E |
| 5 | B |
| 6 | - |

| REARRANGED SEQUENCE | THUMBNAIL IMAGE | |
|---|---|---|
| | LEFT | RIGHT |
| 1 | C | E |
| 2 | A | B |
| 3 | D | F |
| 4 | - | - |
| 5 | - | - |
| 6 | - | - |

Fig.9A  Fig.9B

PRINTING SEQUENCE TABLE

| PRINTING SEQUENCE | IMAGE DATA |
|---|---|
| 1 | c |
| 2 | d |
| 3 | a |
| 4 | e |
| 5 | b |
| 6 | - |

| PRINTING SEQUENCE | IMAGE DATA | |
|---|---|---|
| | LEFT | RIGHT |
| 1 | c | e |
| 2 | a | b |
| 3 | d | f |
| 4 | - | - |
| 5 | - | - |
| 6 | - | - |

# IMAGE PROCESSING SYSTEM FOR OUTPUTTING SCANNED IMAGES IN THE SPECIFIED SEQUENCES

This application is based on application Nos. 10-49638 and 10-61025 filed in Japan, the contents of which are hereby incorporated by reference.

BACKGROUND OF THE INVENTION

1. Field of the Invention

The present invention relates to an image processing system for outputting a scanned image, and more particularly to an image processing system for changing the output sequence of scanned images.

2. Description of Related Art

Photocopier for business use today is typically equipped with an automatic document feeder (ADF), and starts copy operation when a user presses a start button on a control panel after the user sets a document in the ADF. When one or a plurality of pages of the document is set at one time in the ADF, the photocopier scans the document in the order in which they are set, and then prints out the copies in the scanned sequence, that is, the same sequence to set sequence.

There are cases, however, in which the user does not wish to copy all pages in a set of document, or does not want to copy the document in the order in which they are set in the ADF. In these cases the user must first remove some pages of document not to be copied, or rearrange the document set in the desired sequence, before placing the document in the ADF for reproduction. The time and effort required to complete these tasks, however, increase as the number of pages increases and as the reordering requirements become more complicated. What's more, the original document set must typically be restored to the original sequence by the user after the copy operation is completed, requiring the same time and effort required to prepare the document for copying.

Therefore, there is a need for a photocopier in which the order and/or combination of pages of printed document can be easily changed according to the user's requirements.

SUMMARY OF THE INVENTION

The present invention is therefore directed to an image processing system meeting the aforementioned need, and an object of the present invention is to provide an image processing system for reading and capturing images, and then outputting the read images according to output conditions comprising the output sequence and/or page combination, that can be easily defined by a user.

In a first aspect of the invention, an image processing system is provided. The image processing system comprises a data source, an information processor, and a printer. The data source generates a plurality of pages of print data. Each page of print data corresponds to each page of a document. The data source has a memory to store the print data, and a thumbnail image controller to generate a thumbnail image for each page of the print data. The information processor has a display, a display controller, and a sequence setting controller. The display controller receives the thumbnail images from the data source, and presents the received thumbnail images on the display. The sequence setting controller sets a page sequence for printing by using the thumbnail images presented on the display by the display controller. The page sequence for printing specified by the sequence setting controller is sent to the data source. The printer receives the print data read from the memory in the data source in a sequence specified by the sequence setting controller, and prints the received data in the sequence.

In a second aspect of the invention, an image processing apparatus is provided. The image processing apparatus comprises a display, a display controller, and a page sequence controller. The display controller presents on the display, thumbnail images corresponding to a plurality of pages of print data and a screen for setting page sequence. The screen indicates a plurality of blank areas to place the thumbnail images. The blank areas are arranged on the screen corresponding to a page sequence. An operator specifies a printing sequence by page by moving a thumbnail image of each page on the screen into the blank areas indicating a desired page sequence. The page sequence controller sets a page sequence according to an arrangement of thumbnail images on the screen.

In a third aspect of the invention, a method for specifying a page sequence for a plurality of pages of images is provided. The method comprises: a step for displaying a screen for setting the page sequence on a display, said screen containing a plurality of blank areas arranged in the page sequence; a step for displaying thumbnail images for the plurality of pages of images to be specified a page sequence on the screen; and a step for specifying the page sequence by the thumbnail images displayed on the screen, the thumbnail images being moved to the blank areas in a sequence corresponding to a desired page sequence.

In a fifth aspect of the invention, A program is provided for specifying a page sequence for a plurality of page images. The program comprises: a step for displaying a screen for setting the page sequence on a display, said screen containing a plurality of blank areas arranged in the page sequence; a step for displaying thumbnail images for the plurality of pages of images to be specified a page sequence on the screen; and a step for specifying the page sequence by the thumbnail images displayed on the screen, the thumbnail images being moved to the blank areas in a sequence corresponding to a desired page sequence.

Other objects and attainments together with a fuller understanding of the invention will become apparent and appreciated by referring to the following description and claims taken in conjunction with the accompanying drawings.

BRIEF DESCRIPTION OF THE DRAWINGS

A better understanding of the invention will be obtained by reading the description of the invention below, with reference to the following drawings, in which:

FIG. 5 is a view of a printing sequence setting screen used to describe an operation whereby a user sets the image output sequence;

FIG. 6 is a view of a printing sequence setting screen used to describe an operation whereby a user sets the image output sequence when two images are printed to a single page (2 in 1 copy mode);

FIG. 7 is a diagram that shows a scanning sequence table;

FIG. 8A is a diagram that shows a printing sequence specification table;

FIG. 8B is a diagram that shows a printing sequence specification table for 2 in 1 copying;

FIG. 9A is a diagram that shows a printing sequence table;

FIG. 9B is a diagram that shows a printing sequence table for 2 in 1 copying;

DETAIL DESCRIPTION OF THE PREFERRED EMBODIMENTS

The preferred embodiments of an image processing system according to the present invention are described below with reference to the accompanying drawings. As will be obvious from the following description, an image processing system according to the following preferred embodiments of the invention can output scanned images in a sequence and combination of images that is selected by the user.

(Embodiment 1)

Figure 1:
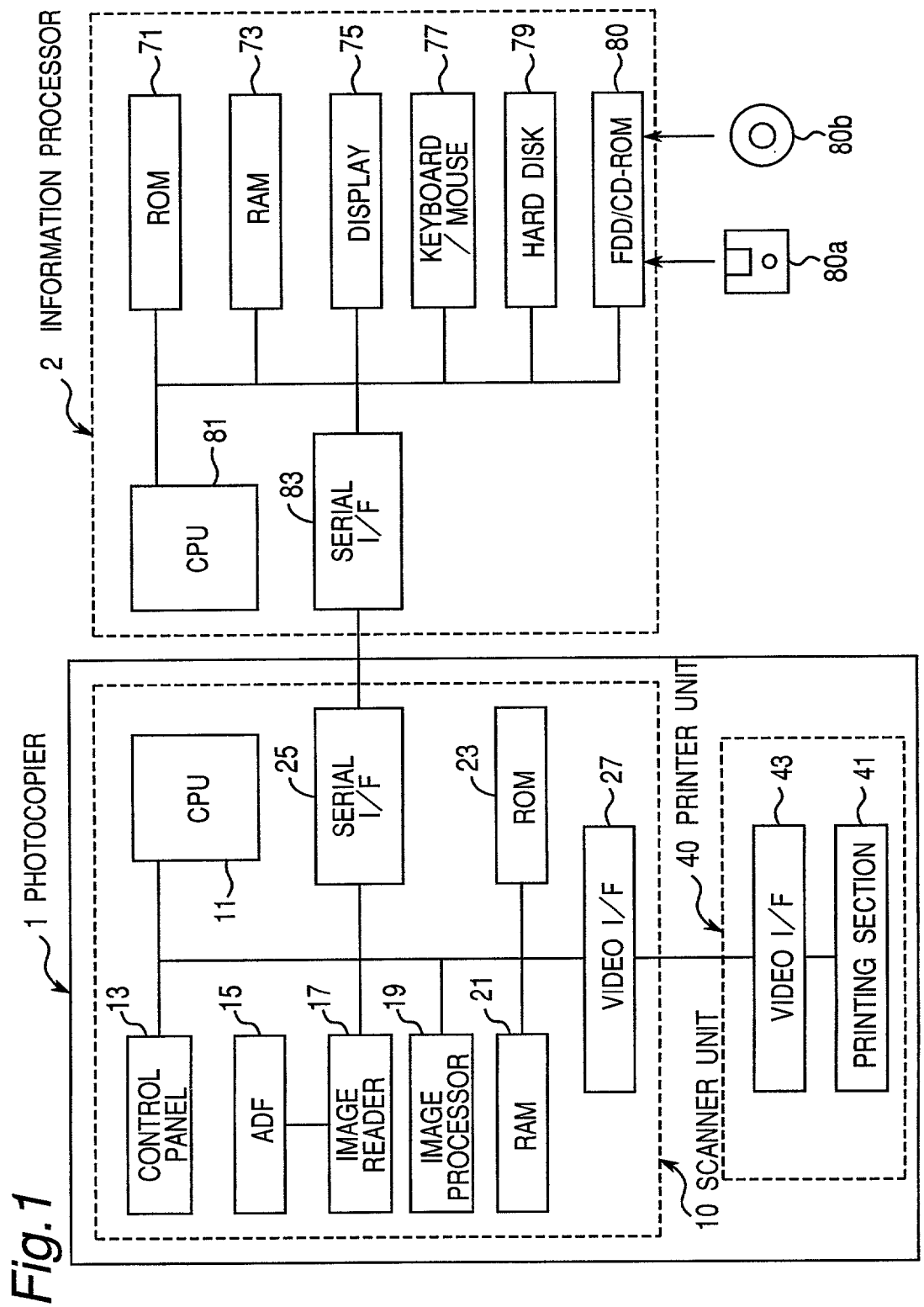
FIG. 1 is a typical block diagram of an image processing system according to a first embodiment of the present invention.

An image processing system according to a first preferred embodiment of the present invention is shown in FIG. 1. As shown in FIG. 1, this image processing system comprises a photocopier 1 and an information processor 2 connected to the photocopier 1.

<Configuration of Photocopier>

The photocopier 1 comprises a scanner unit 10 for scanning and capturing an image of a document, and a printer unit 40 for printing the scanned image to produce a hard copy reproduction of the original document.

The scanner unit 10 operates as a data source to generate print data, and comprises a CPU 11 for running a predetermined program to control the scanner unit 10 and the printer unit 40, an control panel 13 whereby the user specifies various settings and can confirm the photocopier 1 status, an automatic document feeder (ADF) 15, an image reader 17 for scanning and reading an image of a document supplied from the ADF 15, an image processing unit 19 for applying a specific image process to the read image, a RAM 21 for storing data and/or application program a ROM 23 for storing application programs and commands executed by the CPU 11, a serial interface 25 for connecting to external devices, and a video interface 27 for sending/receiving data to/from the printer unit 40.

The printer unit 40 comprises a printing section 41 for printing, and a video interface 43 for sending/receiving data to/from the scanner unit 10.

The scanner unit 10 and printer unit 40 are thus connected through the video interfaces 27 and 43. The photocopier 1 (scanner unit 10) is connected through the serial interface 25 to the information processor 2, and exchanges data and commands with the information processor 2 through the serial interface 25.

Figure 2:
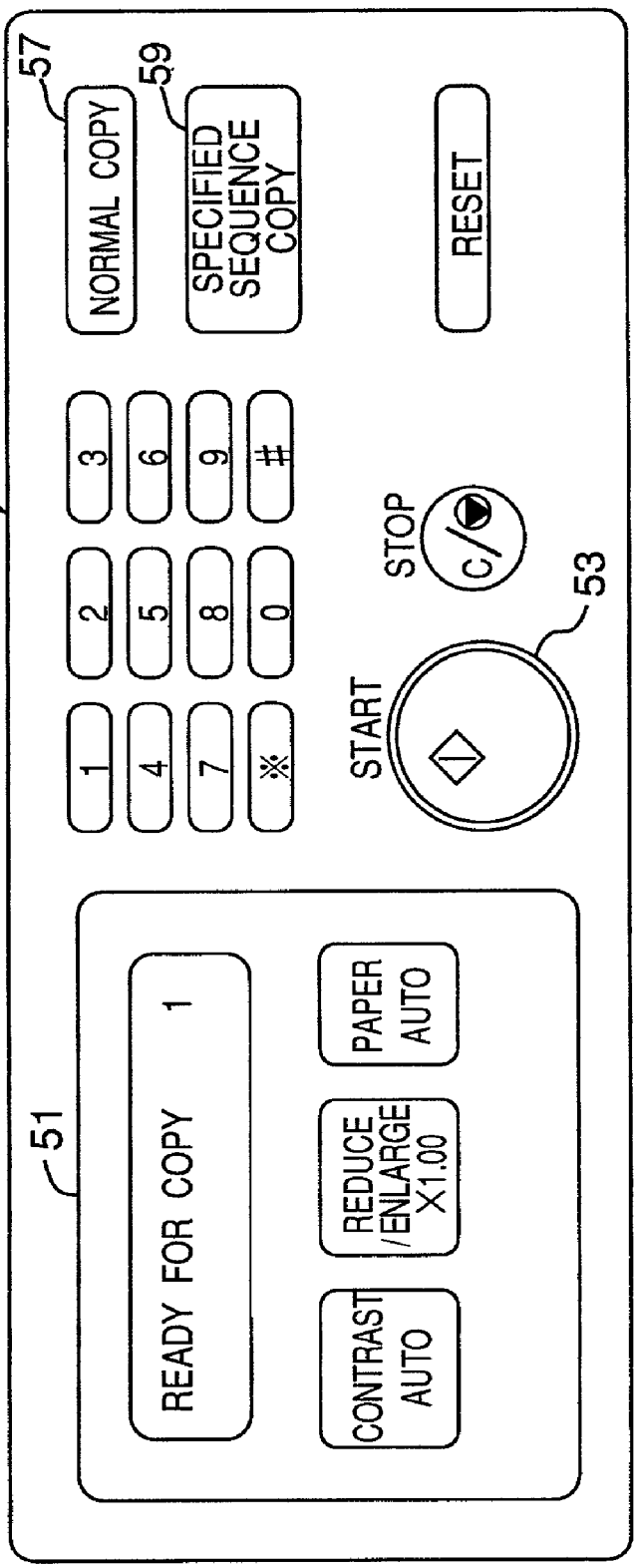
FIG. 2 is a typical diagram that shows a control panel of a photocopier.

FIG. 2 shows a control panel 13 of the photocopier 1. The control panel 13 has a display 51 on which an operation status and settings are displayed, and several buttons. The buttons include a button 53 for starting the copying operation, a button 57 for setting the operating mode of the photocopier 1 to a normal copy mode, a button 59 for setting the operating mode of the photocopier 1 to a specified-sequence copy mode in which the user can specify the printing-out sequence, and so on.

When the normal copy mode is selected, a photocopier 1 according to the present invention scans image of a document placed by the user on the ADF 15 by the scanner unit 10, and then prints the scanned image to paper by the printer unit 40 to output a hard copy.

It should also be noted that the photocopier 1 typically has a variety of other functions, including an "N in 1" copy mode in which N pages of originals can be laid out on and printed to a single page.

<Configuration of Information Processor>

Turning to FIG. 1, the configuration of the information processor 2 in the present invention is described next below. The information processor 2 performs predetermined processes to several kinds of data, for example, image data, document data and so on. As shown in FIG. 1, an exemplary information processor 2 according to the present invention comprises a ROM 71 for storing commands and application programs, a RAM 73 for storing data and application programs, a display 75 for displaying an operating screen and so on, an input device 77 such as a keyboard and a mouse manipulated by the user to control the information processor 2, a hard disk 79 as a data storage medium, an external storage unit 80 for reading data from a external data storage medium such as a floppy disk 80a or a CD-ROM 80b, a CPU 81 for controlling the operation of the information processor 2 by executing commands and programs stored in the ROM 71 and/or RAM 73, and a serial interface 83 for connecting the information processor 2 to an external device.

Figure 3:
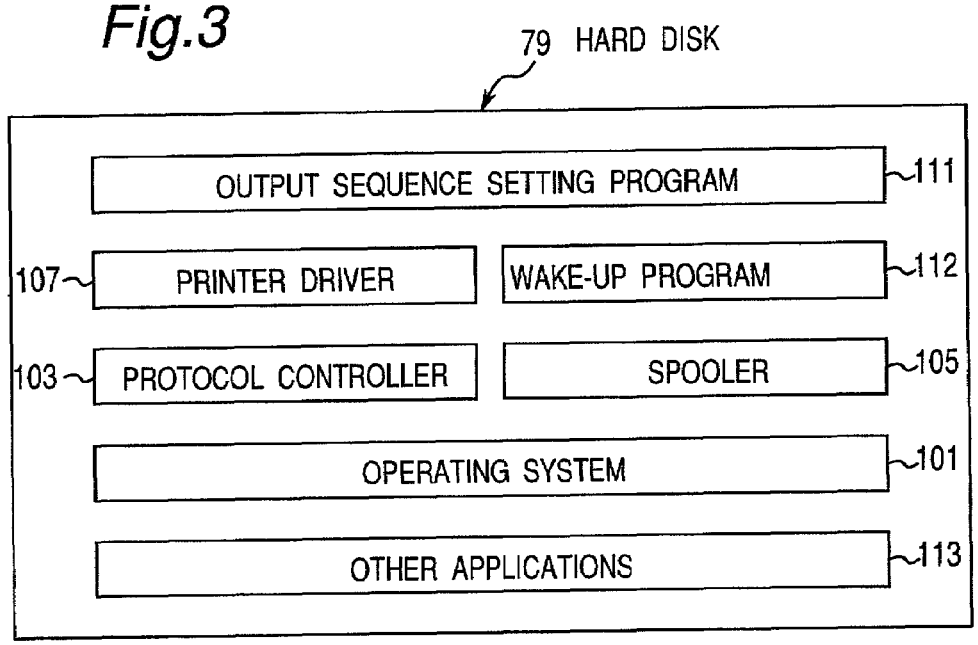
FIG. 3 is a diagram that shows a group of programs stored typically to a hard disk in a information processor.

In the hard disk 79 of the information processor 2, various programs are stored. These are loaded to RAM 73 and executed by the CPU 81 as needed. A typical group of programs stored to the hard disk 79 is shown in FIG. 3. Those programs include an operating system 101, a protocol controller 103 for controlling communication protocols, a spooler 105 for controlling the output queue to any connected printing device, a printer driver 107 for controlling the printing device according to print commands, an application program 111 for specifying the sequence of the output images, a wake-up program 112 for activating the output sequence specification program 111, and other applications 113 that may be used on the information processor 2 such as a word processor, spreadsheet application, and other common application programs. These various application programs can be provided in the form of various data storage media including floppy disk 80*a* and CD-ROM 80*b*.

The operation of the output sequence specification program 111 and the wake-up program 112 are described next below.

<General Operation of Image Processor>

The image processing system comprising a photocopier 1 and information processor 2 as described above according to the present invention operates generally as follows.

[Operation 1]

The photocopier 1 scans the document placed on the ADF 15, generates thumbnail image for each pages of the document by thinning out the scanned images, and sends the thumbnail images to the information processor 2.

[Operation 2]

On the information processor 2, the output sequence specification program 111 is running when the thumbnail images are received. The output sequence setting program 111 thus displays a screen for specifying output image sequence, and the thumbnail images sent from the photocopier 1 as icons on this screen. Using a mouse or other pointing devices, the user can specify output sequence and combination of output images by selecting the thumbnail images (icons) and rearranging them into a desired output sequence. The information processor 2 (output sequence specification program 111) then sends an output condition specified by the user in such a way including the output sequence and the combination of output images, to the photocopier 1.

[Operation 3]

When the photocopier 1 receives the output condition from the information processor 2, it prints the scanned images in the sequence and combination defined in the output condition.

That is, in the image processing system according to this embodiment, when the photocopier 1 scans plural pages of the document, it temporarily stores the scanned images to RAM 21. The photocopier 1 then waits for the user specification including output sequence and output combination. When this user specification is received at the photocopier 1, the photocopier 1 prints the scanned images according to the sequence and combination specified in the output condition. It is noted that the user specifies the desired image sequence and combination using the output sequence specification program 111 running on a information processor 2 connected to the photocopier 1.

<Image Sequence Specification>

An exemplary method whereby the user specifies the printing sequence in operation 2 is described in detail below.

Figure 4:
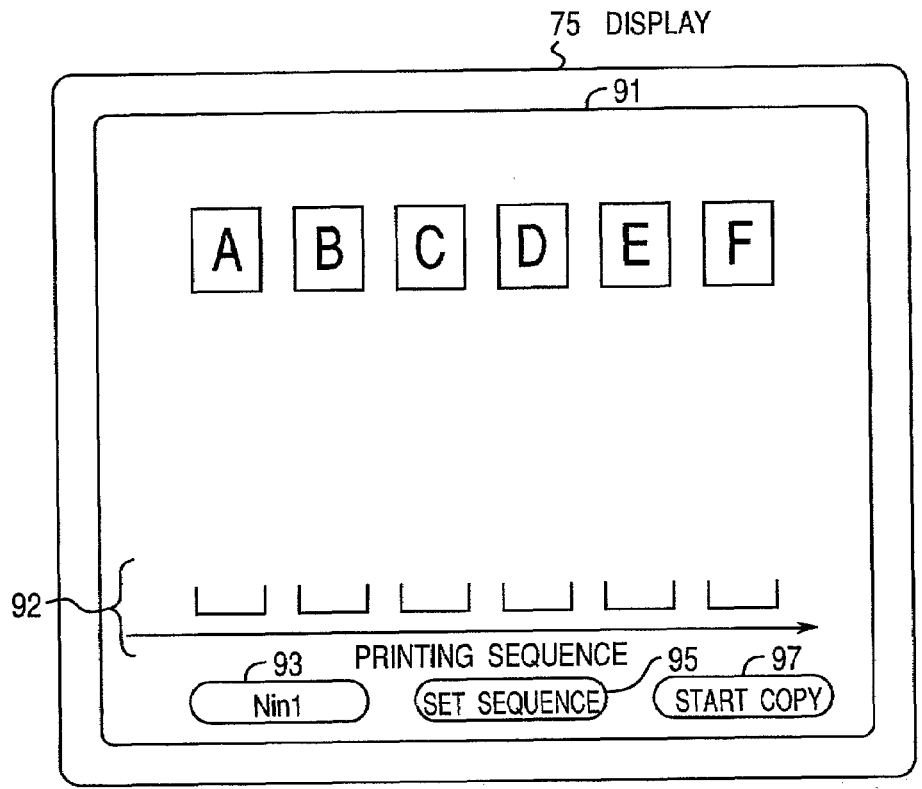
FIG. 4 is a typical view of the default status of an image sequence setting screen.

Specifying the printing sequence is accomplished on the image sequence specification screen presented on the display 75 of the information processor 2. FIG. 4 shows a printing sequence setting screen on which the thumbnail image icons displayed thereon can be manipulated by using a mouse as the input device 77.

The thumbnail images sent from the photocopier 1 are displayed on the printing sequence setting screen 91. They are shown as "A" to "F" in FIG. 4. The user then specifies the output sequence (printing sequence) of the original document corresponding to the thumbnail images by using the mouse to drag and drop the thumbnail images to the sequence specification area 92 shown at the bottom of the screen 91 in the desired output sequence.

For simplicity and convenience, the thumbnail images and a sequence specification area 92 for only six pages are shown in the sequence specification screen 91 in FIG. 4. However, it may be possible to display more thumbnail images on the screen 91 by using predetermined keys (not shown in the figures), for example, for scrolling the screen. Furthermore, it may be possible to select desired images to be output from the scanned images by dragging-and-dropping only the thumbnail images corresponding to the desired images onto the sequence specification area 92.

After rearranging the thumbnail images in the desired output sequence, the user clicks a button 95 to confirm the sequence to print out, and then clicks a button 97 to start copying the images in the specified sequence.

The process whereby the user specifies the printing sequence on the screen 91 is described more specifically with reference to FIG. 5 below. As shown in FIG. 5, images scanned in the sequence "A", "B", "C", "D", "E", "F" are rearranged for printing to the sequence "C", "E", "A", "B", "D". The confirmed sequence information is then sent to the photocopier 1, and the photocopier 1 prints copies of the originals corresponding to the thumbnail images in the specified order.

On the printing sequence setting screen 91, thumbnail images which have been moved to the area 92 can be displayed with lower gray level than thumbnail images which have not been moved to the area 92, enabling the user to recognize easily that the printing sequence of the images corresponding to the thumbnail image have already been specified. It is also possible to enable one thumbnail image to be placed at a plurality of positions in the area 92.

On the printing sequence setting screen 91, it is also possible to define a rearrangement of thumbnail images for N in 1 printing, that is, printing N originals to one page. In this case, a button 93 to set N in 1 printing is clicked on the screen 91; the user is prompted to specify the value of N. An N in 1 setting screen is then presented for defining the N in 1 printing sequence. FIG. 6 indicates that user operation for setting printing sequence on the N in 1 setting screen 91*b* (when N=2). In FIG. 6, the case of 2 in 1 printing or two originals are copied to one page is shown. That is, in this example, the originals corresponding to thumbnail images C and E are printed to page 1, originals corresponding to thumbnail images A and B are printed to page 2, and original corresponding to thumbnail images D is printed to page 3.

It is therefore possible as described above for a user to define the printing sequence and the combination of originals printed using thumbnail images of scanned images.

<Tables used in Information Processor>

A scanned sequence table, a printing sequence specification table and a printing sequence table referenced in the image processing system according to the present invention are described next below. These tables are stored in RAM 21, RAM 73, hard disk 79, or other data storage medium in the photocopier 1 or information processor 2.

FIG. 7 shows the scanned sequence table. The scanned sequence table stores information to link the sequence in which the originals are scanned into the photocopier 1 (scanner unit 10) with the scanned images and the thumbnail image generated for each scanned image. In FIG. 7, it is shown that original images "a", "b", "c", "d", "e" and "f" are scanned in this order, and that the thumbnail images corresponding to them are "A", "B", "C", "D", "E" and "F" respectively.

FIGS. 8A and 8B show the printing sequence specification tables. These tables store information to link the printing sequence specified by the user on the information processor 2 with the thumbnail images.

FIG. 8A shows the printing sequence specification table when the normal copy mode is selected, that is, one copy per page. Accordingly, FIG. 8A shows that the image corresponding to thumbnail image "C" is selected for printing to page 1, the image corresponding to thumbnail image "D" is selected for printing to page 2, the image corresponding to thumbnail image "A" is selected for printing to page 3, and so forth.

FIG. 8B shows a printing sequence setting table when the N in 1 copy mode is selected, especially when 2 in 1 copying is selected. Accordingly, FIG. 8B shows that the images corresponding to thumbnail images "C" and "E" are selected for printing to page 1, the images corresponding to thumbnail images "A" and "B" are selected for printing to page 2, and so forth.

FIGS. 9A and 9B show the printing sequence tables. These tables store the information to link the final printing order with the scanned images. The printing sequence table is generated based on the scanned sequence table and the printing sequence specification table.

FIG. 9A shows a printing sequence table used for the normal copy mode. FIG. 9A thus shows that scanned image "c" is selected for printing to page 1, scanned image "d" is selected for printing to page 2, scanned image "a" is selected for printing to page 3, and so forth.

FIG. 9B likewise shows a printing sequence table for an N in 1 copy mode; especially 2 in 1 copying is selected. FIG. 9B thus shows that scanned images "c" and "e" are selected for printing to page 1, scanned images "a" and "b" are selected for printing to page 2, and so forth.

The operation of the photocopier 1 and the information processor 2 is described next below with particular attention to the operations for specifying the output sequence.

<Main Control Routine of Photocopier>

Figure 10:
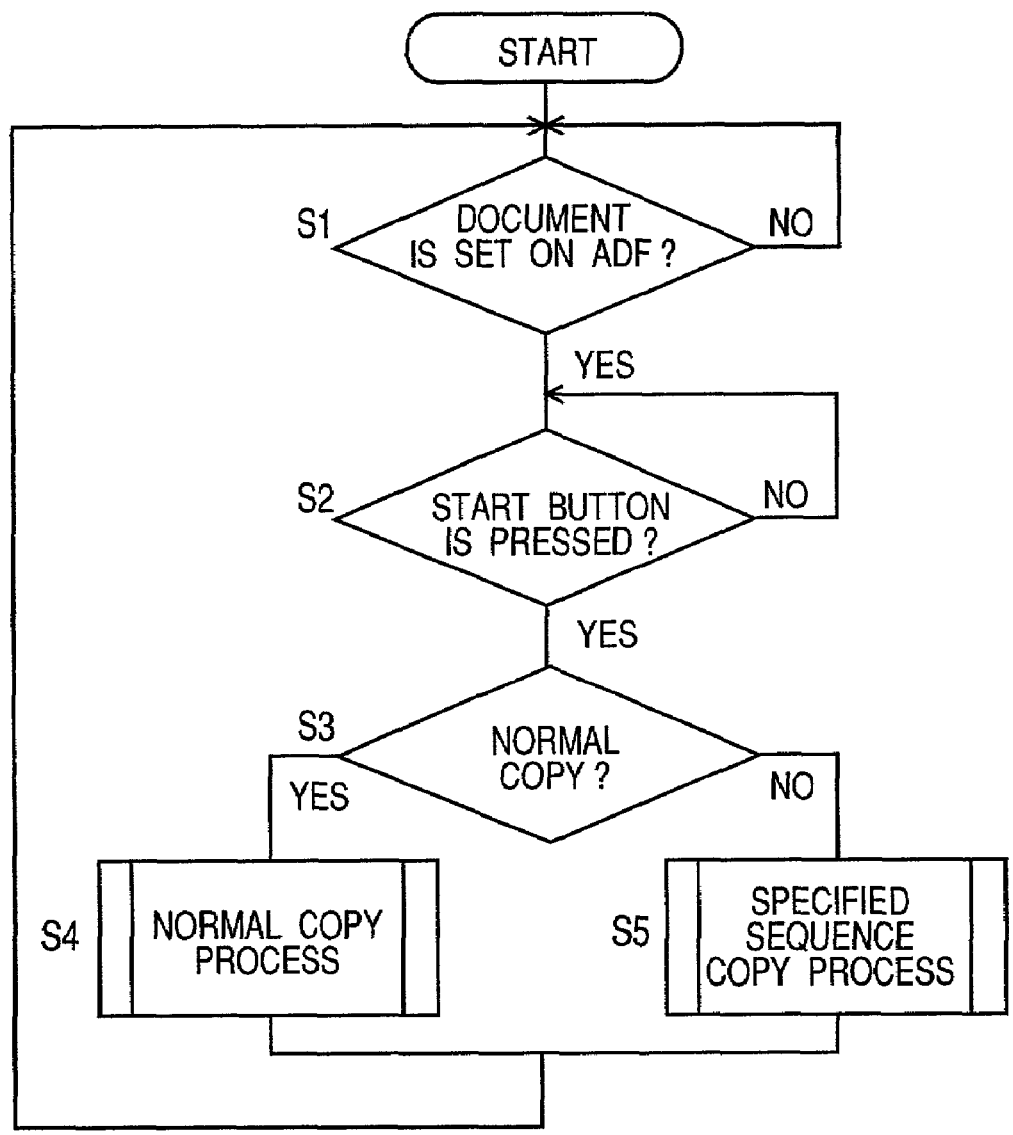
FIG. 10 is a flow chart of the main control routine executed by a CPU of a photocopier.

FIG. 10 is a flow chart of the main control routine executed by the CPU 11 of the photocopier 1 according to this preferred embodiment. This program is started when the power of the photocopier 1 is turned on.

As shown in FIG. 10, this main loop starts by determining whether or not a document with one or more pages of images to be copied are placed in the ADF 15 (S1).

When the document are not placed, step S1 loops back to itself as the program continues to wait for the document to be placed in the ADF 15.

When the document is detected in the ADF 15, it is determined whether the user has pressed the start button 53 on the control panel 13. When not, step S2 loops back to itself as the program waits for the user to press the start button 53.

When the start button 53 is pressed, it is determined what operating mode is selected, that is, whether the normal copy mode or specified-sequence copy mode is selected. The operating mode is selected using the normal copy button 57 or the specified-sequence copy button 59 on the control panel 13.

When the normal copy mode is selected, a normal copy process (S4) is performed. In this mode the document placed in the ADF 15 are scanned and then printed out in the same sequence as with a conventional photocopier. Therefore, the process (S4) is not described here.

When the specified-sequence copy mode is selected, a specified-sequence copy process (S5) is performed. This process (S5) is detailed below.

When the normal copy process (S4) or the specified-sequence copy process (S5) is completed, the program loops back to step S1, and again waits for a document to be placed in the ADF 15.

<Specified Sequence Copy Process>

Figure 11:
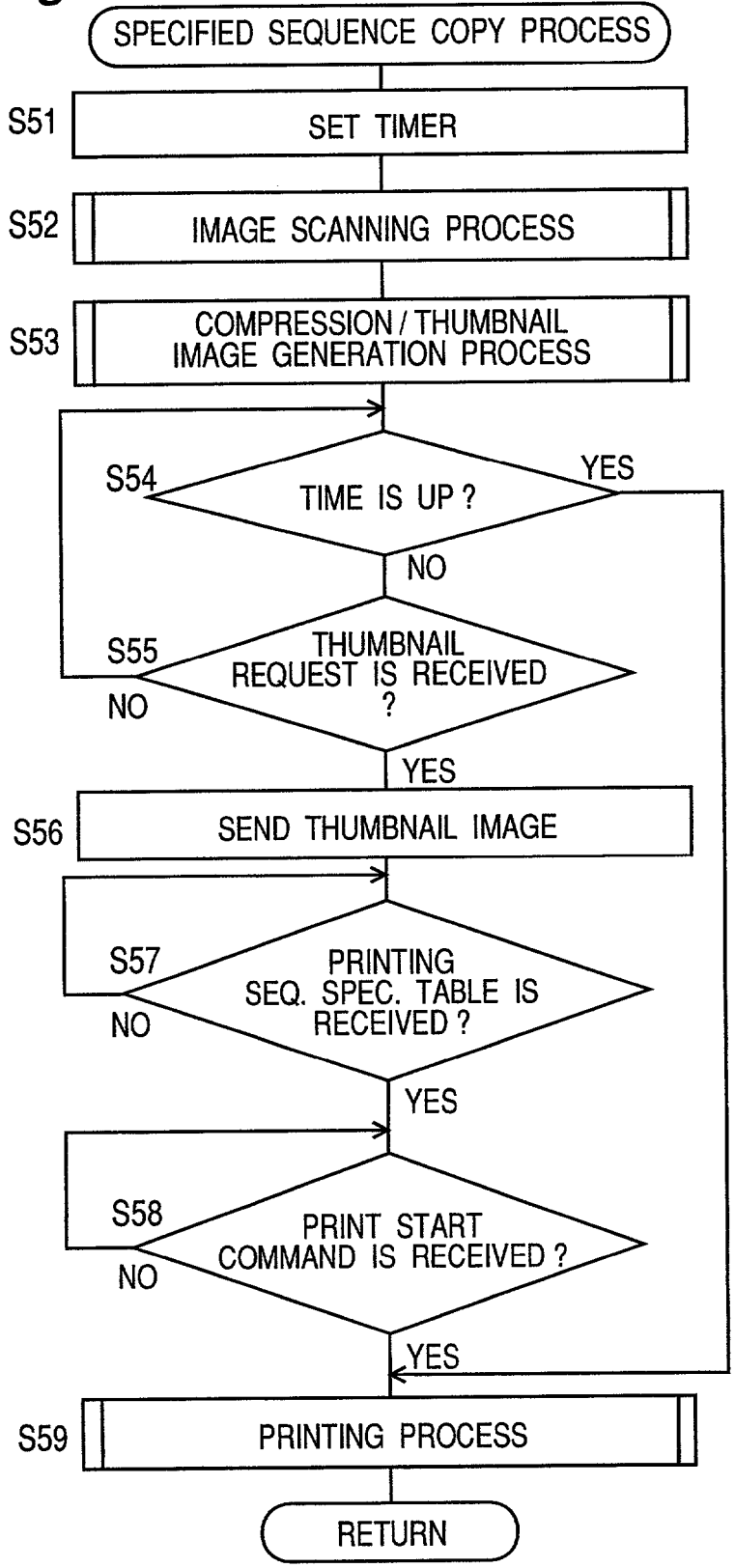
FIG. 11 is a flow chart of a specified sequence copy process.

Referring to FIG. 11, the specified sequence copy process shown as step S5 is described below. This process controls a process for scanning images of the document and output of the scanned images in the sequence specified by the user.

The first step in this process is to set an internal timer (not shown in the figures) (S51). An image scanning process (S52) is then performed in which the document placed in the ADF 15 is scanned, and an image for each page in the document is stored to RAM 21. Details of this process (S52) are described further below.

Next follows an image compression and thumbnail image generation process (S53) in which thumbnail images are created for each of the images captured in step S52. Details of this process (S53) are also described further below.

It is then determined based on the internal timer set at the beginning, whether a specific period has elapsed, that is, whether a time-out has occurred (S54). When a time-out has not occurred, it is determined whether a thumbnail image request signal has been received from the information processor 2. This thumbnail image request signal is used by the information processor 2 to request the scanner unit 10 to send thumbnail images to the information processor 2.

When the thumbnail image request signal has not been received, the procedure loops back to step S54, and waits for a predetermined period for a thumbnail image request signal from the information processor 2. When this request signal is not received within this period ("YES" in step S54), the procedure skips forward to step S59. When a thumbnail image request signal is received before the time-out occurs ("YES" in step S55), the scanner unit 10 sends the thumbnail images to the information processor 2 through the serial interface 25 (S56).

When the information processor 2 receives the thumbnail images, the output sequence setting program 111 presents the sequence setting screen 91 on the display 75. The user then specifies the output sequence by manipulating the thumbnail images on the sequence setting screen 91, and the program 111 creates based on a sequence information specified by the user the printing sequence specification table which defines the relationship between the thumbnail images and the output sequence of the images corresponding to the thumbnail images. When the user then presses the start copy button 97 on the screen 91 to start copying, the printing sequence specification table and print start command are sent to the photocopier 1 (to scanner unit 10).

After sending the thumbnail images to the information processor 2 (S56), the scanner unit 10 waits for the printing sequence specification table from the information processor 2 (S57). When the table is received ("YES" in step S57), it is determined whether the print start command has been received from the information processor 2 (S58). When the print start command is received, printing process (S59) commences. The printing process (S59) sets the image output sequence based on the printing sequence specification table, and then prints the images in this output sequence. In the case where a time-out was previously detected in step S54, all of the original images are printed in the order in which they were scanned.

The photocopier 1 according to this embodiment thus creates thumbnail images from the scanned images and sends the thumbnail images to the information processor 2.

The output sequence setting program 111 running on the information processor 2 receives these thumbnail images, then generates the printing sequence specification table based on the output sequence and output image selection information (that is, which of the scanned images are to be printed) defined by the user, and finally sends this table to the photocopier 1. Based on this table, the photocopier 1 selects the images to print from among the scanned images, and prints the selected images in the specified order.

<Image Scanning Process>

Figure 12:
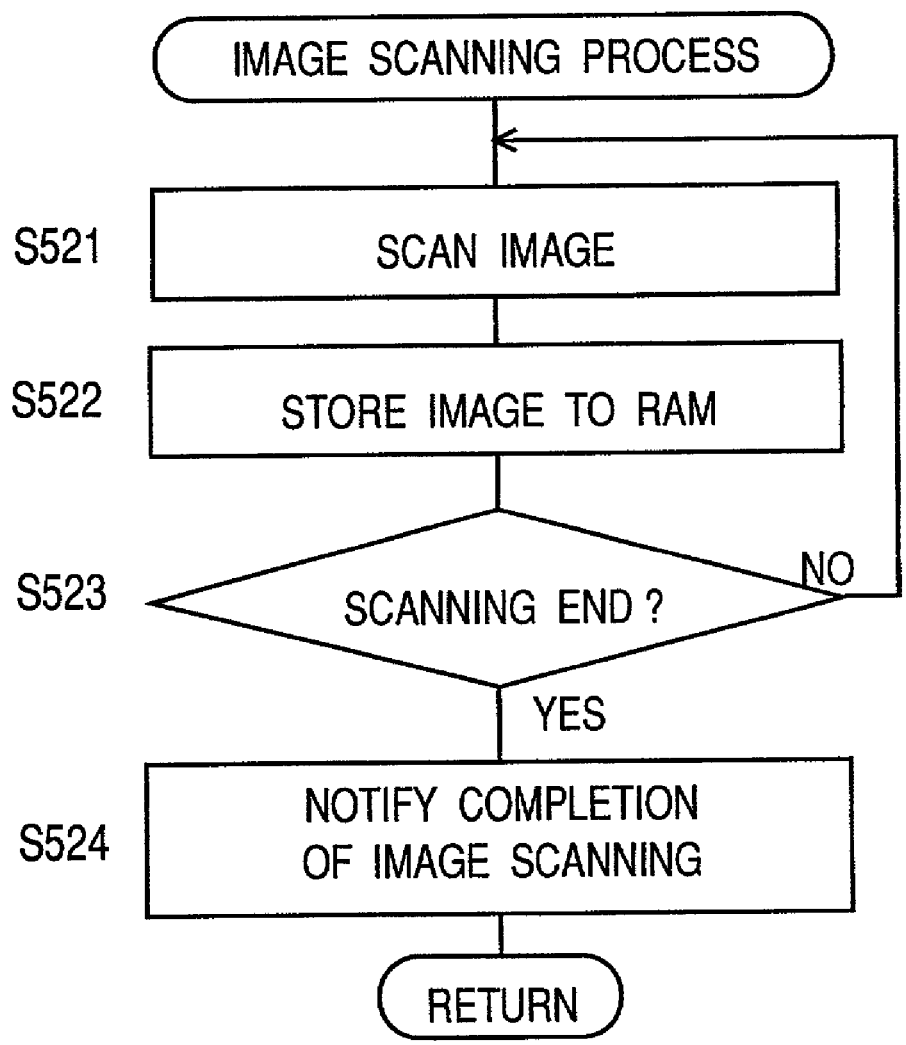
FIG. 12 is a flow chart of an image scanning process.

FIG. 12 is a flow chart of the image scanning process shown as step S52 in FIG. 11. This process scans each page in a document placed in the ADF 15, and captures an image of each page to RAM 21.

This process starts by scanning and capturing an image of a document page placed in the ADF 15 by means of the image reader 17 of the scanner unit 10 (S521). Once the image is captured, it is stored to RAM 21, that is, the page images are stored in the sequence where they are scanned (S522). It is then determined whether the entire document has been scanned (S523). When not, the process loops back to S521 to scan, capture, and store an image of the next page. This loop from S521 to S523 repeats until all pages have been captured. When all pages of images are scanned, captured, and stored, the information processor 2 is notified that the scanning process is completed (S524).

<Compression and Thumbnail Image Generation Process>

Figure 13:
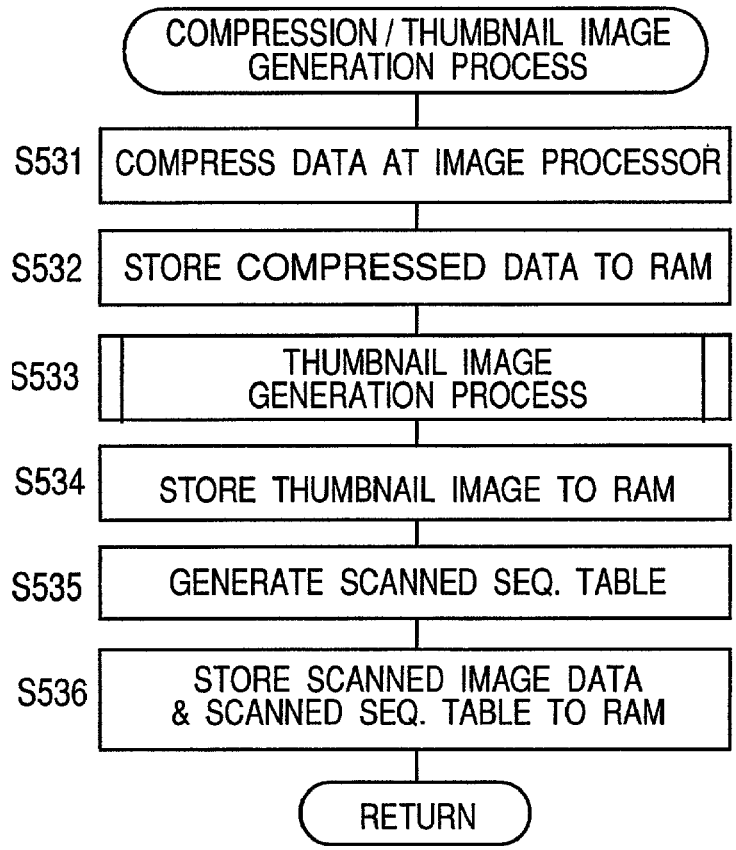
FIG. 13 is a flow chart of an image compression and thumbnail image generation process.

FIG. 13 is a flow chart of the image compression and thumbnail image generation process shown as step S53 in FIG. 11. This process creates thumbnail images of the scanned images, and the scanned sequence table for storing the relationship between the scanned images and the corresponding thumbnail images.

More specifically, the scanned images stored to RAM 21 are compressed by the image processor 19 (S531), and the compressed image data is stored to RAM 21 (S532). The image processor 19 then runs a thumbnail image generation process (S533) to create a thumbnail image for each of the compressed images stored to RAM 21, and stores the created thumbnail images to RAM 21 (S534). The scanned sequence table for storing the relationship between the image data scanning sequence, the compressed image data, and the thumbnail images is then generated (S535). Finally, the scanning image data and the scanned sequence table are stored to RAM 21 (S536). The process then terminates.

Figure 14:
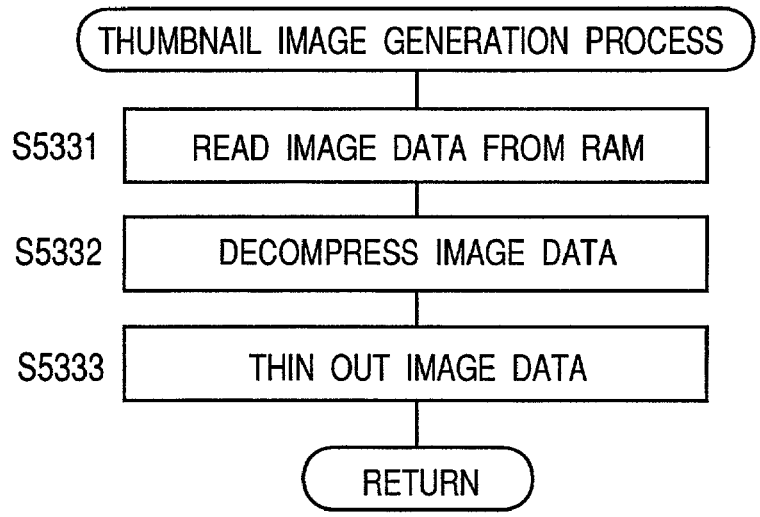
FIG. 14 is a flow chart of a thumbnail generation process.

FIG. 14 is a flow chart of the thumbnail image generation process shown as step S533 in FIG. 13. This process creates the thumbnail images from the scanned images. This process simply reads the compressed image data from RAM 21 (S5331), decompresses the image data (S5332), and then generates the thumbnail image by thinning out image data (S5333).

Figure 15:
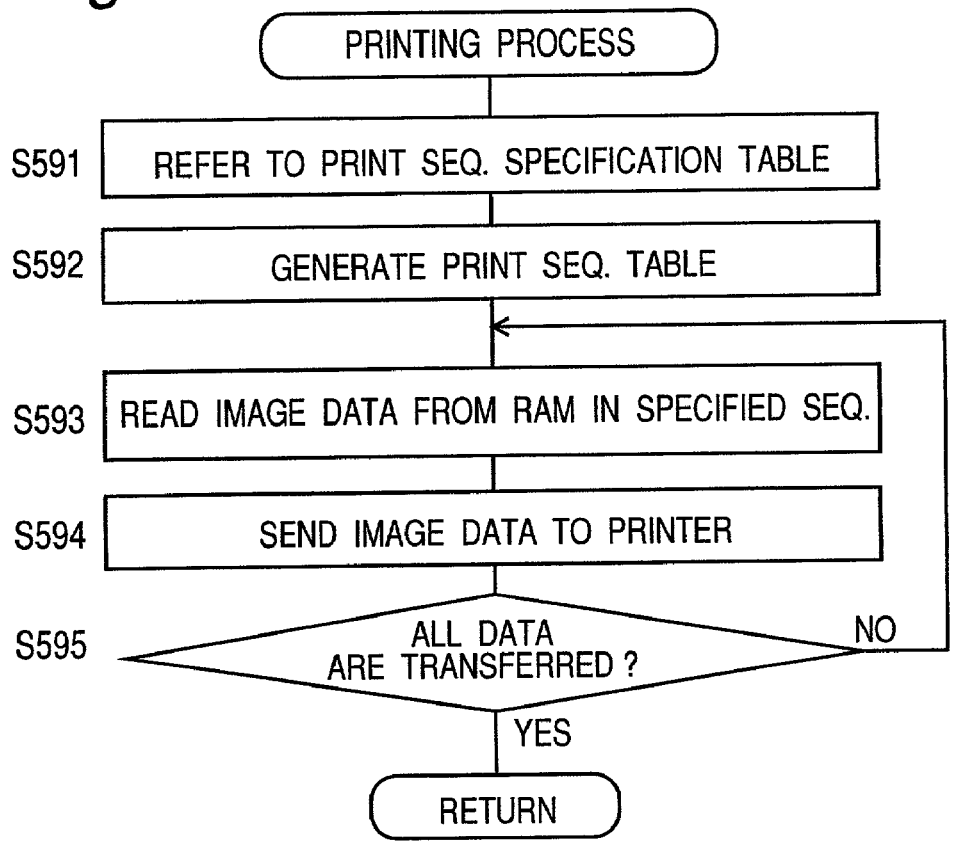
FIG. 15 is a flow chart of a printing process.

FIG. 15 is a flow chart of the printing process shown as step S59 in FIG. 11. This process outputs the images to the printer unit 40 in the sequence specified in the printing sequence specification table.

At first the printing sequence specification table is referenced (S591), and then the printing sequence table is created, which lists the images to be printed and the sequence in which they are to be printed (S592). Based on the sequence shown in the printing sequence table, the images are read from RAM 21 (S593) and the image data is sent to the printer unit 40 (S594). The image data is then printed by the printer unit 40 in the order received. It is then determined whether all images selected for printing by the user have been sent to the printer unit 40 (S595) The loop from S593 to S595 thereafter repeats to read and print the images based on the printing sequence table until all selected images have been printed.

<Operation of Information Processor (Output Sequence Setting Program)>

The operation of the information processor 2 as it relates to the above-described operation of a photocopier 1 according to this preferred embodiment is described next below. This operation of the information processor 2 is accomplished by running the wake-up program 112 and the output sequence setting program 111. The wake-up program 112 is described first below.

The wake-up program 112 is for starting the output sequence setting program 111. The wake-up program 112 is started when the power of information processor 2 is turned on, and runs continuously in the background to monitor receipt of a start-up request for the output sequence setting program 111 from the scanner unit 10. More specifically, a start-up request for the output sequence setting program 111 is issued from the scanner unit 10 when the specified sequence copy button 59 on the control panel 13 of the scanner unit 10 is pressed. The wake-up program 112 then starts the output sequence setting program 111 when the start-up request is detected. After starting the output sequence setting program 111, the wake-up program 112 continues to monitor whether or not the output sequence setting program 111 is still running. Subsequently when the output sequence setting program 111 terminates, the wake-up program 112 monitors receipt of the start-up request.

Figure 16:
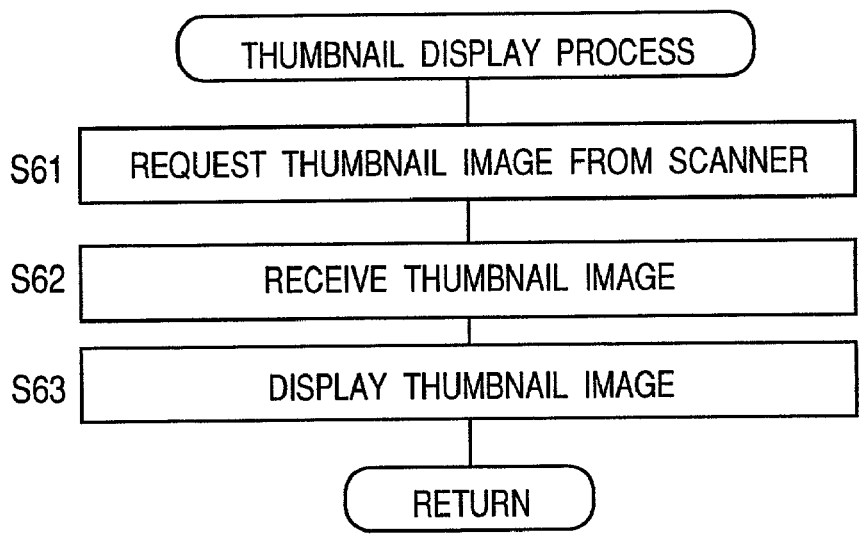
FIG. 16 is a flow chart of a thumbnail display process of a printing sequence setting application.

When the output sequence setting program 111 starts, it presents the printing sequence setting screen 91. When the scanner unit 10 finishes scanning the originals placed in the ADF 15, it sends the notice to the information processor 2 to inform the information processor 2 of completion of image scanning (step S524 in FIG. 12). When the program 111 receives this completion notice, it begins a thumbnail image display process, which is described below with reference to the flow chart thereof in FIG. 16.

In the thumbnail image display process the scanner unit 10 is requested to send the thumbnail images, which are then presented on the display 75 so that the user can specify the output sequence. More specifically, when the output sequence setting program 111 is notified by the scanner unit 10 that all pages of the document have been scanned and captured, it sends a thumbnail image request to the scanner unit 10 (S61). The scanner unit 10 then responds to this request by sending the thumbnail images to the information processor 2 (S55 and S56 in FIG. 11). When the program 111 then receives the thumbnail images from the scanner unit 10 (S62), it presents the thumbnail images in the screen 91 on the display 75 (S63).

Figure 17:
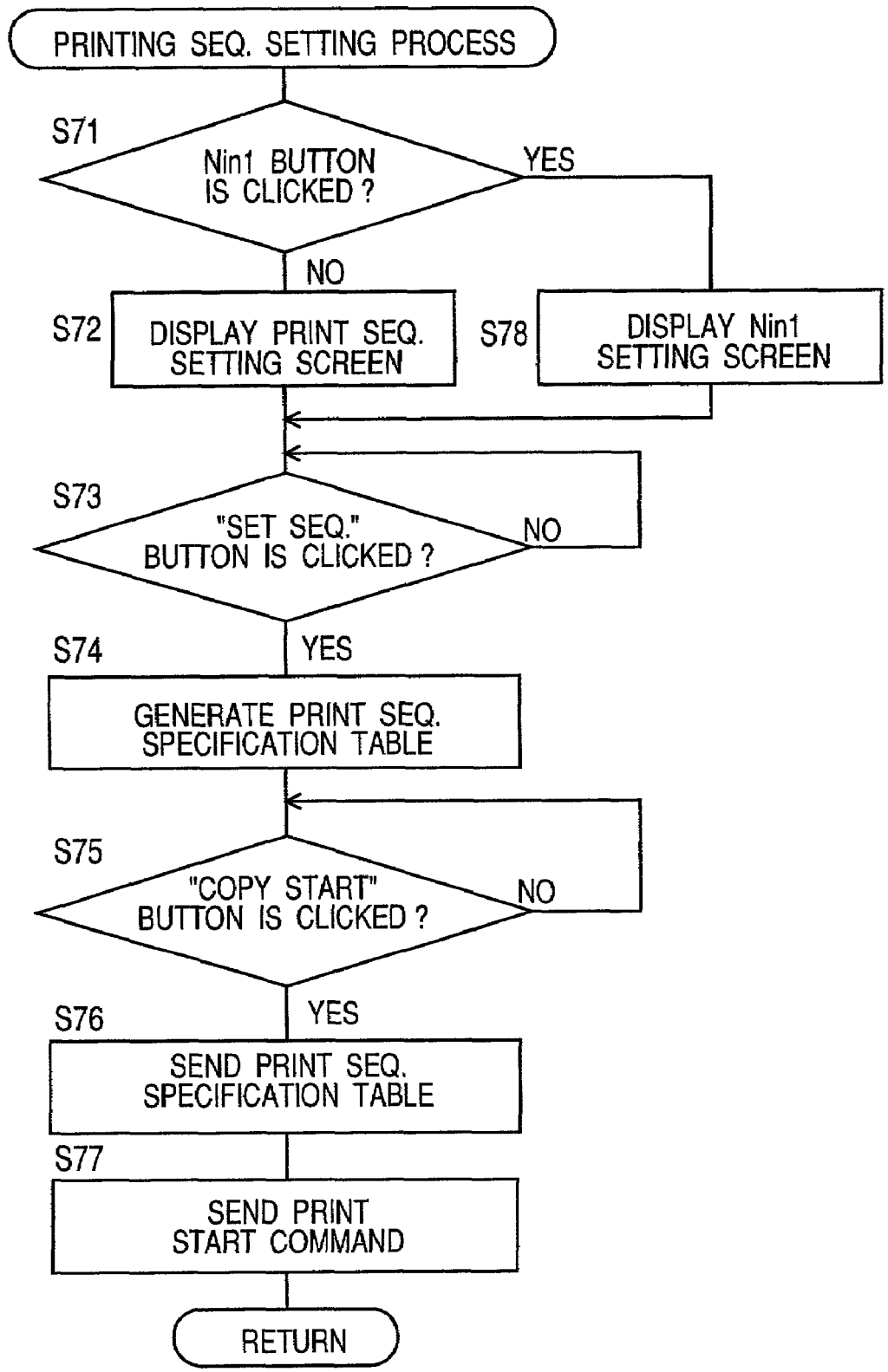
FIG. 17 is a flow chart of the printing sequence setting process of a printing sequence setting application.

The program 111 then waits for the user to specify the output sequence and what images to print using the screen 91. When user operation is detected, the program 111 starts the printing sequence setting process as shown in the flow chart in FIG. 17.

This process presents the screen 91 for the user to specify the printing sequence, creates the printing sequence specification table based on the thumbnail images and sequence defined by the user, and sends this table to the scanner unit 10.

More specifically, it is determined whether the N in 1 setting button 93 on the screen 91 was clicked (S71). When not, the screen 91 remains displayed (S72). When the button 93 was clicked, the N in 1 setting screen 91b for setting the N in 1 printing sequence is presented (S78) The user defines the printing sequence by simply dragging and dropping the thumbnail images, which are shown in both screens 91 and 91b.

The printing sequence is confirmed by the user clicking the set sequence button 95 in this embodiment. Therefore, the output sequence setting program 111 waits for the button 95 to be clicked (S73). When the button 95 is clicked, the program 111 then generates the printing sequence specification table based on the order of the thumbnail images on the sequence setting screen 91 (S74). The program 111 then waits for the start copy button 97 to be clicked (S75). When the button 97 is clicked, the program 111 sends the printing sequence specification table to the scanner unit 10 (S76), and then sends a print start command to the scanner unit 10 (S77).

Once the scanner unit 10 receives the printing sequence specification table and print start command from the information processor 2, it outputs the images in the specified sequence using the process shown in steps S57 to S59 in FIG. 11.

It should be noted that the photocopier 1 according to this embodiment has both copier and printer functions. The copier function can be used for printing images scanned and captured by the scanner unit 10 on the printer unit 40, that is, for photocopying the document. The printer function can be used for printing image data received through the serial interface 25 from a information processor 2 on the printer unit 40, that is, enabling the photocopier 1 to be used as a printing peripheral for the information processor 2.

Therefore, image data produced by applications installed on the information processor 2, and image data input to the information processor 2 from a digital camera or other external imaging device, can be printed using the photocopier 1, and the output sequence of these images can be controlled by manipulating the thumbnail images on the information processor 2 as described above. In this case, the output sequence setting program 111 substitutes the procedures shown in FIGS. 18 and 19 for those shown in FIGS. 16 and 17, respectively.

Figure 18:
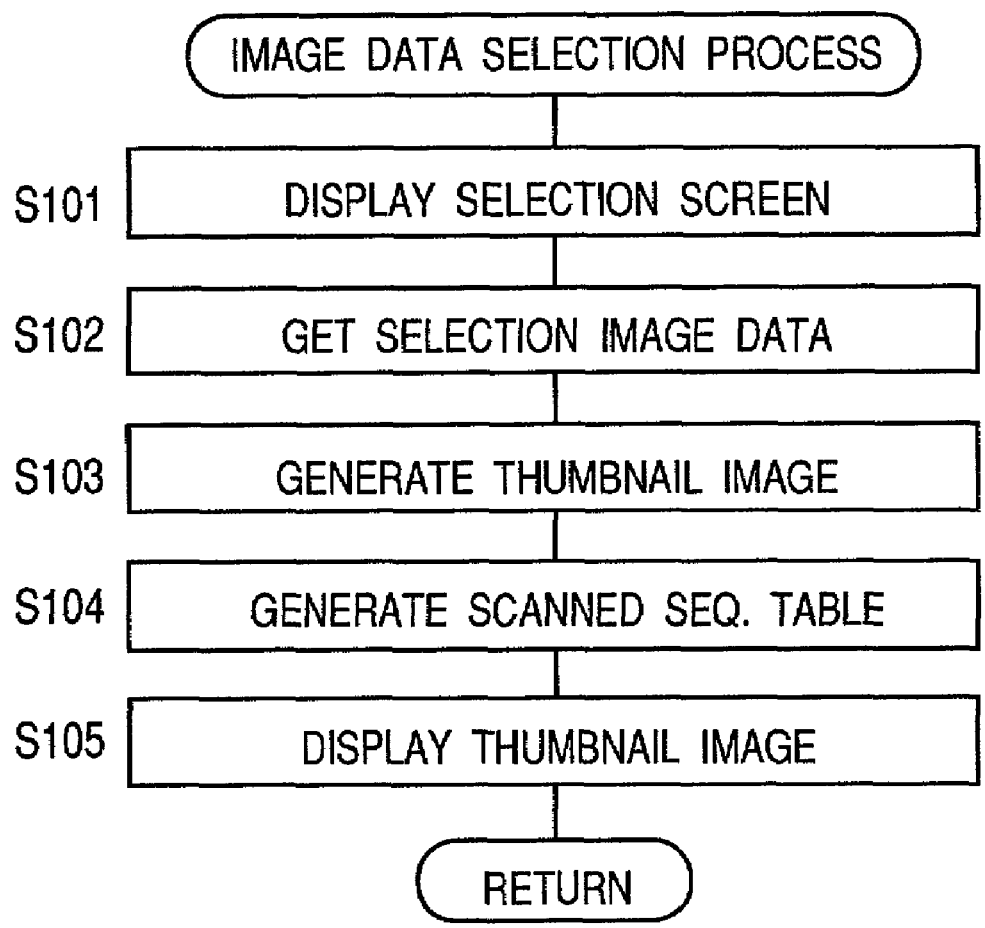
FIG. 18 is a flow chart of an image data selection process of a printing sequence setting application.

FIG. 18 shows a flow chart of the image data selection process. In this process, the output sequence setting program 111 firstly presents a selection screen whereby the user selects the images (image data) to be printed from among the images created by some other applications or input from a digital camera, for example (S101). The user then selects the desired images from this setting screen. Image data for the images selected by the user is then read (S102), and thumbnail images corresponding to read images are generated (S103). The scanned sequence table defining the relationship between scanned image data and thumbnail images is then generated (S104), and the thumbnail images are presented on the printing sequence setting screen 91 (S105).

Figure 19:
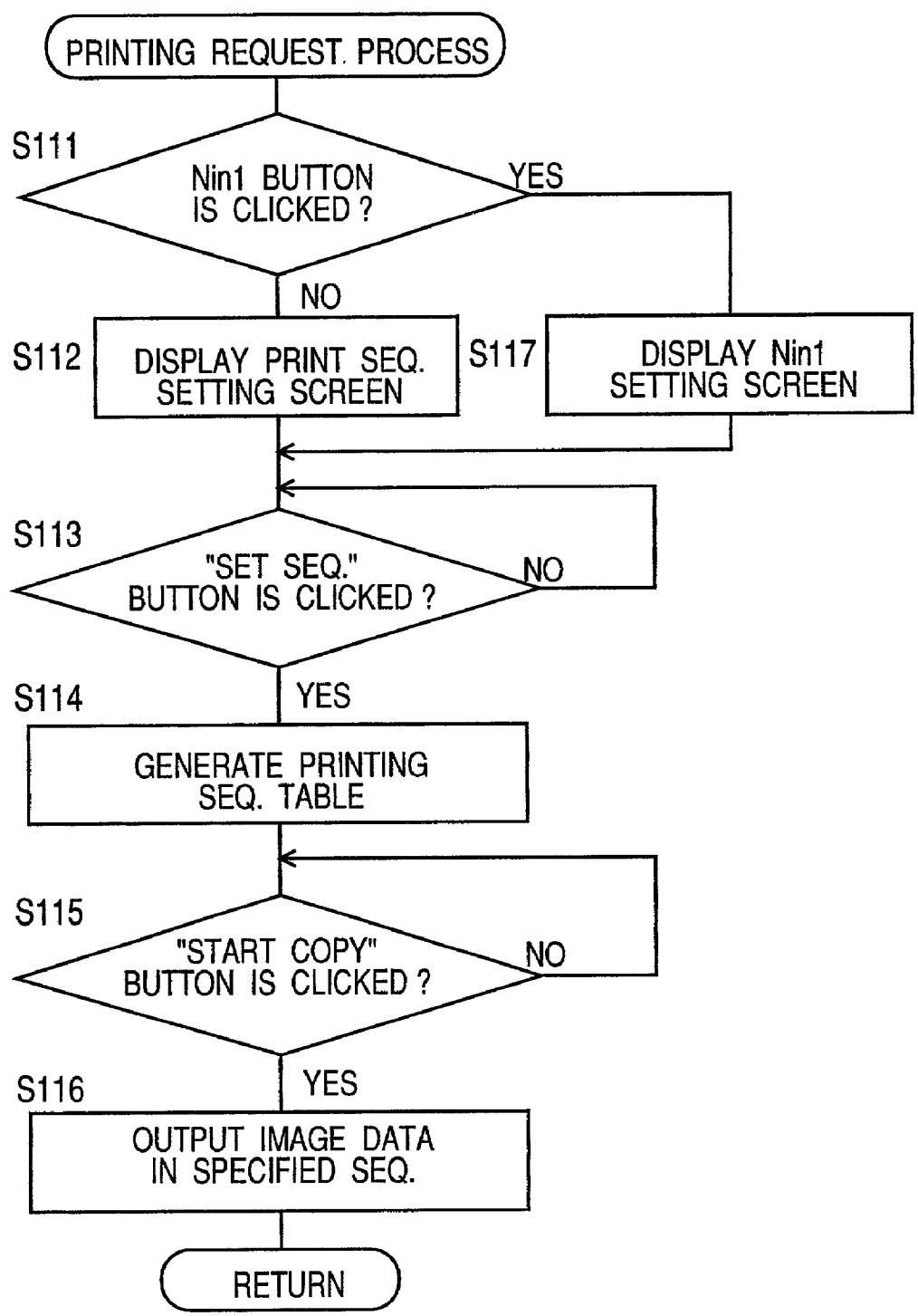
FIG. 19 is a flow chart of a printing request process of a printing sequence setting application.

The image data printing sequence is then specified by rearranging the thumbnail images on the screen 91, and the printing request process shown in FIG. 19 is run according to the user's actions. In this printing request process, it is detected whether the N in 1 setting button 93 is clicked (S111). When not, the screen 91 is presented (S112), or when the button 93 is clicked, the N in 1 setting screen 91b is presented (S117). It is then detected whether the set sequence button 95 is clicked (S113). When the button 95 is clicked, the printing sequence table is created with reference to the order of the displayed thumbnail images and the scanned sequence table (S114). It is then detected whether the copy button 97 is clicked (S115). When the start copy button 97 is clicked, the selected images (image data) are output to the photocopier 1 in the defined output sequence by referring to the printing sequence table (S116). The photocopier 1 then operates in a printer mode to sequentially print out the data sent from the information processor 2 by the printer unit 40.

The photocopier 1 or an image forming apparatus according to the present invention thus enables a user to define the output sequence of images to be printed using thumbnail images whether the images are scanned and captured by the scanner unit 10, created on a information processor 2, or input from a digital camera.

(Embodiment 2)

Figure 20:
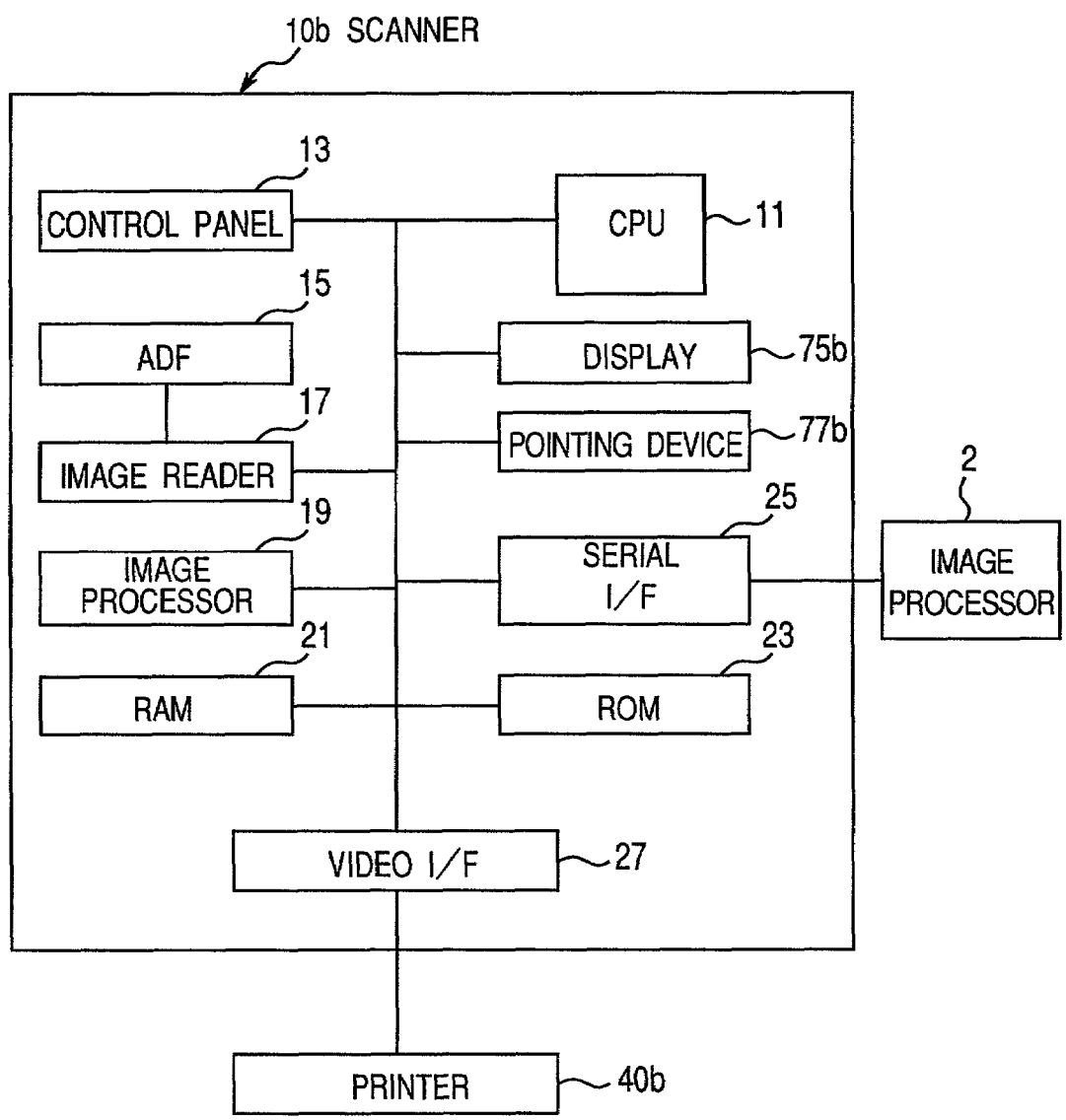
FIG. 20 is a flow chart of a typical block diagram of an image processing system according to a second embodiment of the present invention.

FIG. 20 is a block diagram of an image processing system according to a second preferred embodiment of the invention. As shown in FIG. 20, the scanner unit 10 and the printer unit 40 integrated into the photocopier 1 in the first embodiment shown in FIG. 1 are separated to a discrete scanner 10b and printer 40b. The scanner 10b is connected via a video interface 27 to the printer 40b, and via a serial interface 25 to an information processor 2. Images captured by the scanner 10b can thus be output to the printer 40b and/or the information processor 2 by means of these interfaces 27 and 25.

The scanner 10b shown in FIG. 20 is substantially identical to the scanner unit 10 shown in FIG. 1, but additionally comprises a display 75b for presenting the printing sequence setting screen, and a pointing device 77b such as a mouse for selecting the output sequence. In addition to the programs for accomplishing the control defined in the flow charts in FIGS. 10 to 15, the ROM 23 of this scanner 10b also stores the output sequence setting program 111 for accomplishing the control defined in FIGS. 16 and 17.

It is therefore possible to perform tasks for setting the output sequence performed on the information processor 2 in the first embodiment on a scanner 10b. In this case, the CPU 11 of the scanner 10b runs the output sequence setting program 111, and presents thumbnail images of the scanned images on the display 75b. The user then rearranges the thumbnail images and selects the images to be printed using the pointing device 77b. Based on this user-defined information, the CPU 11 sequentially outputs the selected images to the printer 40b. Note that this operation is the same as in the first embodiment above, and further description thereof is thus omitted below.

While the sequence specified operation is done on the display 75b with a pointing device 77b, the operation can alternatively be done on the control panel 13, where the control panel 13 comprises a touch sensitive screen. In this case, the output sequence setting program 111 is activated when the specified-sequence copy button is clicked on the control panel 13.

It is therefore possible for a scanner 10b to output scanned image information in the output sequence and combination of images defined by the user.

It will be obvious to one with ordinary skill in the art that in both the above first and second embodiments of the invention the output sequence setting program 111 and other programs can be provided using various means of storage, including but not limited to a ROM or other semiconductor device, floppy disk or other magnetic storage medium, and CD-ROM, DVD or other optical storage medium.

Furthermore, while the final device to which the scanned images are output is an integrated or discrete printer, the invention shall obviously not be so limited. For example, images and sequence information can be alternatively output to another data processing or storage device, including memory, CD-ROM, or other storage medium.

(Embodiment 3)

Figure 21:
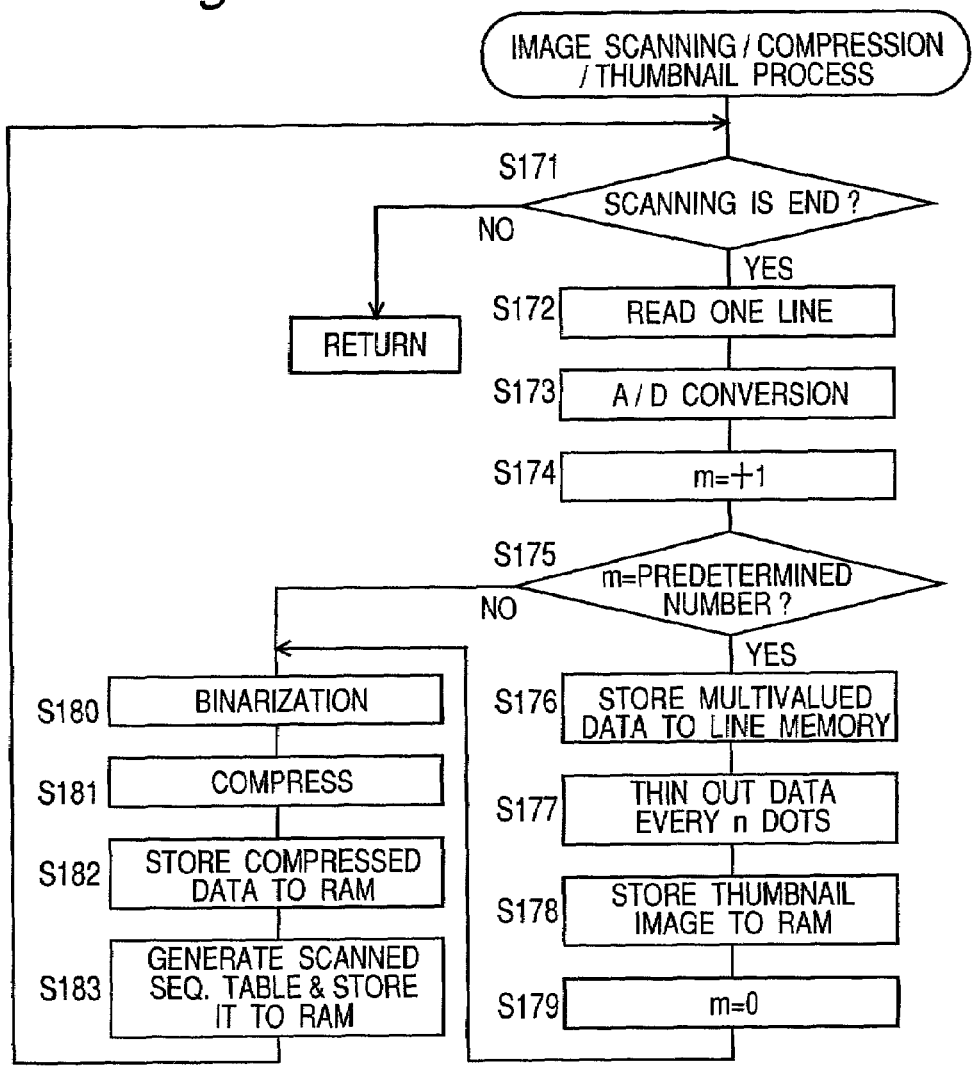
FIG. 21 is a flow chart of an alternative version of the image scanning process and the image compression and thumbnail generation process of the present invention.

FIG. 21 is a flow chart of an alternative embodiment of the image scanning process (S52) and the compression and thumbnail image generation process (S53) shown in the flow chart in FIG. 11.

As shown in FIG. 21, the first step in this process is to determine whether scanning by the image reader 17 has finished (S171). When not, one scanning line of the image is captured by the image reader 17 (S172), and the captured image signal is A/D (Analog to Digital) converted to a multivalued digital signal (S173). A counter m, which is initialized to zero (0), is then incremented by 1 (S174). It is then determined whether the counter m is equal to a predetermined value, which is the number of scanning lines in this embodiment (S175).

When the counter m does not equal the predetermined value ("NO" in step S175), the A/D converted multivalued signal is binarized to a two-valued signal (S180), and then compressed (S181). The compressed data is then stored to RAM 21 (S182). Note that step S182 corresponds to step S532 in FIG. 13. The scanned sequence table is then generated and stored to RAM 21 (S183); this step corresponds to steps S535 and S536 in FIG. 13. This loop from steps S171 to S175 and S180 to S183 is repeated until counter m equals the predetermined value.

When counter m reaches the predetermined value, that is, when all image lines have been captured ("YES" in step S175), the multivalued digital signal is written to a line memory (not shown in the figures) (S176). The image data represented by the multivalued digital signal in the memory is thinned out every n bits and then reduced to a thumbnail image (S177). This thumbnail image is then stored to RAM 21 (S178). The step S178 corresponds to step S534 in FIG. 13.

The counter m is then reinitialized to 0 (S179), and steps S180 to S183 are performed. When all images lines have thus been captured and processed, the procedure ends.

With this process a multivalued digital signal is captured to the line memory every m lines and thinned out by n dots to reduce the image to produce a display signal, that is, thumbnail image. The thumbnail image is then stored in the file storage area of RAM 21 with a discrete ID number.

This image data capture process can thin out and reduce the image to a specified resolution, and store this thinned out image to a file storage area with a discrete ID number assigned thereto. The values of m and n may be variable so that the level of thinning out used to generate the icon data can be adjusted and controlled.

By thus generating a display signal, that is, icon data, and sending only the icon data to the information processor 2, the amount of data that must be transferred can be significantly reduced, and the data transfer time thereby shortened.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image processing system comprising:
    (a) a data source for generating a plurality of pages of print data, each page of print data corresponding to each page of a document, said data source having
        a memory for storing the print data, and
        a thumbnail image controller for generating a thumbnail image for each page of the print data;
    (b) an information processor having
        a display,
        a display controller for receiving, from the data source, the thumbnail images for each page of print data and presenting the received thumbnail images on the display,
        a sequence setting controller for setting a page sequence for printing by using the thumbnail images presented on the display by the display controller, the page sequence for printing specified by the sequence setting controller being sent to the data source; and
    (c) a printer for receiving the print data read from the memory in a sequence specified by the sequence setting controller, and printing the received data in the sequence, wherein
    thumbnail images for each page of print data arranged in an original sequence and thumbnail images for each page of print data rearranged according to a specified sequence are simultaneously displayed in contrast to each other on a common display screen of the display.

2. The image processing system according to claim 1, wherein:
    the data source has a first table to link the thumbnail image with the print data;
    the sequence setting controller creates a second table to link the thumbnail image with the printing sequence of the print data; and
    the data source outputs the print data to the printer by referencing these first and second tables.

3. The image processing system according to claim 1, wherein the data source further comprises an image reader for scanning the document with a plurality of pages to generate the print data.

4. The image processing system according to claim 3, wherein the image reader and the printer are integrated in a single unit to compose a digital photocopier.

5. The image processing system according to claim 1, wherein the display controller displays the thumbnail images and a plurality of regularly ordered blank areas to indicate a page sequence on a screen, and
    wherein a printing sequence by page is specified by an operator's moving a thumbnail image of each page on the screen into the blank areas indicating a desired page sequence.

6. The image processing system as claimed in claim 1, wherein the printer carries out image formation on a plurality of recording media respectively based on the plurality of pages of print data in accordance with the page sequence for printing set by the sequence setting controller.

7. An image processing apparatus comprising:
    (a) a display;
    (b) a display controller for presenting on the display, thumbnail images corresponding to a plurality of pages of print data and a screen for setting page sequence, the screen indicating a plurality of blank areas in which the thumbnail images are to be placed, the blank areas of the screen being arranged corresponding to a page sequence, a printing sequence for printing each page being specified by an operator moving a thumbnail image of each page presented on the display into the blank areas of the screen indicating a desired page sequence; and
    (c) a page sequence controller for setting a page sequence according to an arrangement of thumbnail images in the blank areas of the screen, wherein thumbnail images presented on the display arranged in an original sequence and thumbnail images in the blank areas on the screen that are rearranged according to a specified sequence are simultaneously displayed in contrast to each other on a common display screen.

8. The image processing apparatus as claimed in claim 7, wherein a printer carries out image formation on a plurality of recording media respectively based on the plurality of pages of print data in accordance with the page sequence for printing set by the page sequence controller.

9. The image processing apparatus according to claim 7, wherein the image processing apparatus is connected by a communication line to an image reader, the thumbnail images being sent to the image processing apparatus from the image reader via the communication line.

10. The image processing apparatus according to claim 9, wherein the display controller and the page sequence controller are achieved in a software application, the software application being activated in response to a command sent from the image reader via the communication line.

11. The image processing apparatus according to claim 7, wherein a printing sequence the plurality of pages of print data is determined according to the page sequence.

12. The image processing apparatus according to claim 11, wherein when a mode for printing two page images on a single page is selected, the plural blank areas are presented in sets of two on the screen.

13. A method for specifying a page sequence for a plurality of pages of images, comprising:
   a step of displaying on a display a screen for setting the page sequence, said screen containing a plurality of blank areas arranged in the page sequence;
   a step of displaying thumbnail images for the plurality of pages of images for which a page sequence is to be specified, the displayed thumbnail images being arranged in an original sequence; and
   a step of specifying the page sequence for the displayed thumbnail images by moving the thumbnail images to the blank areas in a sequence corresponding to a desired page sequence, wherein
   thumbnail images arranged in the original sequence and thumbnail images rearranged according to a specified sequence are simultaneously displayed in contrast to each other on a common screen of the display.

14. The method according to claim 13, further comprising a step for setting the printing sequence according to the page sequence specified in the step for specifying the page sequence.

15. The method according to claim 14, wherein when a mode for printing two page images on a single page is selected, the plural blank areas are presented in sets of two on the screen.

16. The method of claim 14, further comprising a step of carrying out image formations on a plurality of recording media respectively based on the plurality of pages of images in accordance with the printing sequence specified in the step for setting the printing sequence.

17. A computer readable medium having encoded thereon a computer readable program for specifying a page sequence for a plurality of page images, by directing the operations of:
   a step of displaying on a display a screen for setting the page sequence, said screen containing a plurality of blank areas arranged in the page sequence;
   a step of displaying thumbnail images for the plurality of pages of images for which a page sequence is to be specified, the displayed thumbnail images being arranged in an original sequence; and
   a step of specifying the page sequence for the displayed thumbnail images by moving the thumbnail images to the blank areas in a sequence corresponding to a desired page sequence,
   wherein thumbnail images arranged in the original sequence and thumbnail images rearranged according to a specified sequence are simultaneously displayed in contrast to each other on a common screen of the display.

18. The computer readable medium according to claim 17, wherein the page sequence specified in the step for specifying the page sequence is used for setting the printing sequence, and wherein when a mode for printing two page images on a single page is selected, the plural blank areas are presented in sets of two on the screen.

19. The computer readable medium according to claim 18, wherein image formations are carried out on a plurality of recording media respectively based on the plurality of page images in accordance with the set printing sequence.

20. A method for designating a page sequence for a plurality of pages of images, comprising the steps of:
   displaying, on a screen, both a plurality of thumbnail images for the plurality of pages of images in an original sequential order and blank area for displaying thumbnail images in a sequence designated by a user;
   accepting a designation of rearrangement of the thumbnail images by moving the thumbnail images to the blank area to be in the sequence designated by the user; and
   simultaneously displaying the plurality of thumbnail images for the plurality of pages of images both in the original sequence and in the sequence designated by the user in the blank area on the screen.

21. The method according to claim 20, further comprising the step of outputting the plurality of pages of images in the designated order.

22. The method according to claim 21, wherein the step of outputting the plurality of images includes image formations on a plurality of recording media respectively based on the plurality of page images in accordance with the designated order.

* * * * *

UNITED STATES PATENT AND TRADEMARK OFFICE
CERTIFICATE OF CORRECTION

PATENT NO.        : 7,239,405 B2
APPLICATION NO. : 09/258067
DATED             : July 3, 2007
INVENTOR(S)       : Yasushi Yamade It is certified that error appears in the above-identified patent and that said Letters Patent is hereby corrected as shown below:

On the title page of the patent, item "(75) Inventors:", please delete "Takenori Idehara, Machida (JP)", leaving only "Yasushi Yamade, Yokohama (JP)".

Signed and Sealed this

Twenty-eighth Day of April, 2009

JOHN DOLL
*Acting Director of the United States Patent and Trademark Office*